United States Patent [19]
McDermott

[11] Patent Number: 5,417,928
[45] Date of Patent: May 23, 1995

[54] SINGLET DELTA OXYGEN GENERATOR AND PROCESS

[75] Inventor: William E. McDermott, Rancho Palos Verdes, Calif.

[73] Assignee: Rockwell International Corporation, Seal Beach, Calif.

[21] Appl. No.: 201,950

[22] Filed: Feb. 25, 1994

[51] Int. Cl.⁶ .................. A62B 7/08; B06B 1/00; C01B 13/00; H05B 7/09
[52] U.S. Cl. .................... 422/120; 422/124; 422/128; 423/579; 372/55; 372/89
[58] Field of Search ............. 422/120, 124, 128; 423/579; 372/89, 55

[56] References Cited

U.S. PATENT DOCUMENTS

| | | | |
|---|---|---|---|
| 4,102,950 | 7/1978 | Pilipovich et al. | 423/579 |
| 4,246,252 | 1/1981 | McDermott et al. | 423/579 |
| 4,267,526 | 5/1981 | McDermott et al. | 331/94.5 G |
| 4,310,502 | 1/1982 | Wagner | 423/579 |
| 4,318,895 | 3/1982 | Richardson et al. | 423/579 |
| 4,342,116 | 7/1982 | MacKnight et al. | 372/89 |
| 4,461,756 | 7/1984 | Rockenfeller | 423/579 |
| 4,558,451 | 12/1985 | McDermott et al. | 372/89 |
| 4,643,889 | 2/1987 | Uchiyama et al. | 423/579 |
| 4,668,498 | 5/1987 | Davis | 423/579 |
| 5,229,100 | 7/1993 | Harpole | 423/579 |

*Primary Examiner*—Robert J. Warden
*Assistant Examiner*—Christopher Y. Kim
*Attorney, Agent, or Firm*—H. Fredrick Hamann; Harry B. Field; Steven E. Kahm

[57] ABSTRACT

A generator for producing a flow of excited oxygen in the singlet delta electronic state comprising a vacuum chamber, an inlet feed system, an internal reaction zone, a method for cooling said reaction zone, an outlet system for separating the gas from the liquid, and a means for interfacing this device to a lasing device for directing the flowing singlet delta gas into a laser cavity.

20 Claims, 3 Drawing Sheets

SINGLET DELTA OXYGEN GENERATOR AND PROCESS

BACKGROUND OF THE INVENTION

Chemical lasers operate by directing one or more suitably energized specie(s) through an optical cavity. The optical cavity extracts energy, above some threshold value, from the stream of energized specie(s) and combines it into a single coherent beam, which is then removed from the optical cavity in some manner.

Gaseous molecules such as oxygen are capable of existing in different energy states. A gaseous molecule is considered to be an excited state when its energy is higher than its usual ground state energy level. The excited state for oxygen, denoted the singlet delta state, possesses approximately 1 eV (electron-volt) of energy greater than its ground state. Consequently, $O_2(^1\Delta)$ can serve as an energizing gas and a source of pumping in a high energy chemical laser.

In a chemical oxygen iodine laser, for example, the energized species is predominantly (99%) molecular oxygen in the first electronically excited (singlet delta) state. The remainder of the energy (1%) is contained in the lasing species; atomic iodine which is produced automatically when a small amount (0.5%) of molecular iodine is added to a flow of excited oxygen. Substantially all the energy generated by the laser is originally that stored in the molecular oxygen. Thus, an apparatus capable of producing large amounts of excited oxygen is usually needed to run such a laser at the highest levels of power and efficiency.

Because a primary method of producing singlet delta oxygen for chemical lasers involves the reaction of chlorine gas with a liquid mixture of sodium or potassium hydroxide and hydrogen peroxide, it is desirable for an apparatus to generate excited oxygen atoms to provide: (1) a high interfacial surface area for reaction, (2) a method of separating the chlorine gas from the liquid mixture at the completion of the reaction, and (3) a method for cooling the reaction liquid which heats up during the course of producing singlet delta oxygen. (The heating of the liquid produces water vapor, hydrogen peroxide vapor, and other species which can reduce the efficiency and power of the chemical oxygen iodine laser.)

Chemical generation of $O_2(^1\Delta)$ has been accomplished heretofore by resorting to a variety of methods. These methods, however, were not capable of producing the energizing gas at high enough pressures or with the necessary low vapor concentration in amounts adequate to satisfy the needs of very low weight, highly efficient, chemically pumped high energy lasers.

As previously discussed, the generation of excited molecular oxygen in the singlet delta electronic state is often required to power a chemical laser as well as to provide a stable, gaseous source of an energetic species for chemical laser applications. Current generators of singlet delta molecular oxygen:

1. Usually do not operate particularly well at high pressures (>30 Torr).
2. Normally require external purification of the generated oxygen stream to remove unwanted water and peroxide vapor.
3. Often require high pressure and high flow rate liquid recirculating systems.
4. Can produce undesirable liquid droplets within the flow of molecular oxygen.

This invention relates to high energy chemical lasers and to a device for generating singlet delta oxygen for use with such lasers. More particularly, the invention relates to a simple and dependable apparatus for generating cold, dry molecular oxygen in the singlet delta state—identified by the symbol $O_2(^1\Delta)$—substantially free from the contaminations usually present in such flows.

SUMMARY OF THE INVENTION

In accordance with the invention, it has been found that molecular oxygen in the electronically excited singlet delta state can be generated in an efficient and reliable manner by a generating device (hereafter referred to as a reactor) comprising: (1) an inlet system which includes a gas nozzle to admit a mixture of chlorine gas and a carrier or diluent gas if desired (e.g., helium or nitrogen), and (2) a confined liquid inlet such that the action of the gas stream is to force a liquid, e.g., hydrogen peroxide and a base, all of a hollow tube, hereafter referred to as a reactor tube. A high gas flow rate through a narrow reactor tube produces a pressure gradient within the reactor tube that forces the liquid to the receiving end (opposite the inlet end of the reactor tube) of the reactor tube. During the concurrent flow of gas and the liquid, chlorine is adsorbed at the surface of the liquid film and reacts with the mixture of hydrogen peroxide and base (sodium, potassium, or lithium hydroxide) to produce singlet delta oxygen which replaces the chlorine in the gas stream. Under suitable conditions (i.e., a specific gas mixture, tube diameter, gas flow rate, angle of reactor tube axis relative to the gravity vector, and reactor tube length) a specified fraction of chlorine is converted to singlet delta oxygen. In practice, 0 to approximately 99% of the chlorine could be converted to singlet delta oxygen. A typical operating level may be approximately 90%.

The problem of providing an economical, efficient, dependable, and simple system for generating $O_2(^1\Delta)$ is addressed by a novel generating technique that utilizes a conventional chemical reaction which occurs between gaseous chlorine and basic hydrogen peroxide liquid. A flow of gaseous chlorine and diluent gas and a flow of liquid basic hydrogen peroxide are injected into a cylindrical reactor tube in such a way that the bulk of the liquid is forced to the wall of the tube. The liquid film is driven through the reactor tube by the pressure gradient produced by the gas flow along the tube to a receiving or collection end where the liquid is separated from the gas stream by a unique collection device. Direct, or active, cooling of the liquid film through the reactor tube's walls is provided by conventional cooling fluids such as ammonia, carbon dioxide, or freon.

The generator assembly, hereafter referred to as the reactor, can be fabricated conventionally from plastic, metal, metal-coated plastic, or some other inert material. The liquid feed at the inlet to a reactor tube is connected to a conventional pressurized storage tank or pump-fed from a conventional storage tank. The liquid collected at the outlet end of the reactor tube is connected to a conventional reduced pressure storage tank or is pump-fed into a storage tank. The liquid can then be recirculated and/or reconditioned.

At the receiving or collector end of the reactor tube, the liquid solution is separated from the gas flow and the excited oxygen is directed into the laser cavity. The liquid flow is directed into a reservoir where it can be reused and/or reconditioned. Inlet and outlet liquid streams are isolated from the reactor tube, allowing the outside of the reactor tube to be cooled using standard heat transfer techniques (e.g., passive or forced convection). This is significant because the reaction between chlorine and basic hydrogen peroxide is exothermic (produces heat), which in turn vaporizes water, hydrogen peroxide, and other species from the solution. These products can be deleterious to laser performance. Thus, active cooling of the liquid fill throughout the reactor tube enhances laser performance (efficiency) by reducing the amount of vaporization.

In one embodiment of the invention, the liquid film is driven through the reactor tube by the gas pressure gradient and shear forces induced by a continuous flow of gas. Thus, the reactor may operate (generate molecular oxygen in the excited singlet delta state) in substantially all directions relative to the direction of a gravity vector as well as in zero gravity situations such as space. The desired length of the reactor tube, its diameter, and the liquid and gas flow rates will depend on the orientation of the axis of the reactor tube relative to gravity (if any). For example, in the vertical-up orientation liquid flows against the gravity vector, in the horizontal orientation liquid flows perpendicular to the gravity vector, and in the vertical-down orientation liquid flows with the gravity vector. All orientations can be accommodated by the apparatus of the invention by adjustment of the reactor design and flow parameters such that small variations in relative orientation will not significantly affect the reactor's performance.

A conventional method of generating singlet oxygen by chemically reacting chlorine gas, hydrogen peroxide and sodium hydroxide is disclosed in greater detail in U.S. Pat. No. 4,246,252, issued Jan. 20, 1981 to McDermott et al. The use of a tubular reactor (or wetted wall) to produce singlet oxygen in any position relative to gravity is disclosed in greater detail in U.S. Pat. No. 4,558,451, issued Dec. 10, 1985 to McDermott et al. Both of the foregoing patents are incorporated by reference.

Design advantages of the invention include:
1. Providing a device for generating an adequate supply of an electronically excited gas for use as an energizing medium in a chemical laser.
2. Providing a simple device for generating molecular oxygen in the excited singlet delta state.
3. Providing a simple device which allows for direct cooling of the chemical reaction zone during the generation of an electronically excited gas.
4. Providing a simple device which produces oxygen in the singlet delta electronically excited state in all orientations relative to gravity as well as in zero gravity conditions.

DESCRIPTION OF SPECIFIC EMBODIMENTS

Figure 1:
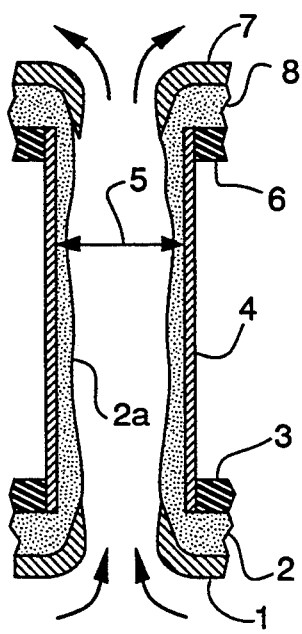
FIG. 1 is a cross sectional schematic illustration of a singlet oxygen generating device (reactor tube) of the invention.

In FIG. 1 a detailed illustration of a reactor tube is shown, in cross section, to include an inlet or injector region 1 which directs a flow of chlorine gas and diluent gas (if desired) into the reactor tube. Basic hydrogen peroxide liquid 2 is admitted from around the edges of the injector (shown in more detail in succeeding figures) in such a way as to force the liquid to the wall 4 of the reactor tube 5. A bottom retainer plate 3 separates the liquid basic hydrogen peroxide from the outside of the reactor tube's wall 4. Gas, admitted at the inlet 1, flows through the reactor tube to the collector 7 where it is separated from the liquid film 2a traveling along the tube's wall. The liquid film 2a flows from the injector end of the tube 2 to the collector end of the tube 8 because the diameter of the reactor tube 5 and the liquid and gas flow rates have been adjusted to produce a pressure gradient in the tube sufficient to do so. The top retainer plate 6 separates the liquid collector reservoir 8 from the wall of the reactor tube 5. The combination of separator plates 3 and 6 allow the outer surface of the reactor tube 5 to be externally (e.g., actively) cooled to produce a cold, dry supply of excited oxygen.

Figure 2:
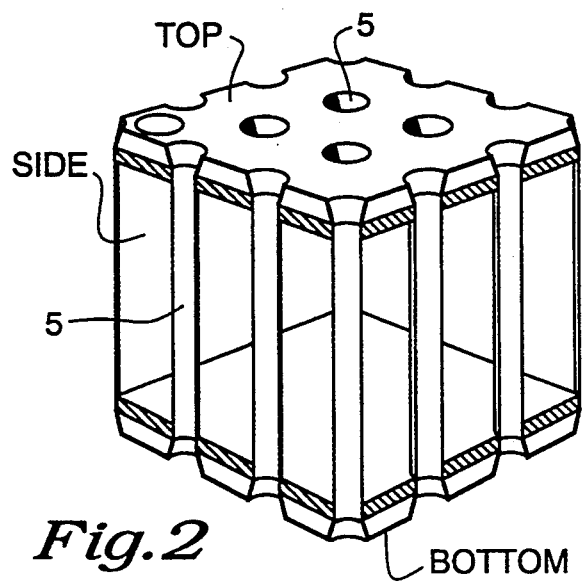
FIG. 2 is a top, bottom, and side view of how a individual reactor tubes shown in FIG. 1 may be arranged to produce larger amounts of singlet oxygen.

In FIG. 2 a top, side, and bottom view of an array of reactor tubes—forming a reactor assembly—are shown. The notations top, bottom, and side are for reference only and do not imply any particular orientation of the reactor with respect to gravity. (Any geometrical configuration relative to gravity can be accommodated.) For example, reactor tubes 5 could be tilted at any angle relative to the reactor's base. FIG. 2 illustrates one possible means for combining the reactor tubes of FIG. 1 to allow the generation of a larger flow of excited oxygen than can be obtained from a single tube. The spacing shown and scale of the apparatus is illustrative only and is not indicative of any preferred spacing. In fact, the reactor tubes 5 could all be touching.

Figure 3:
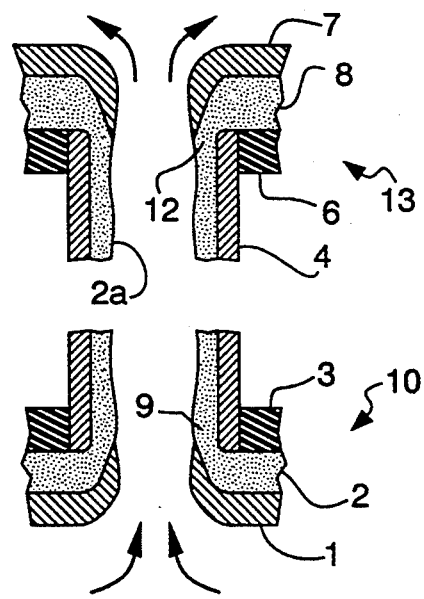
FIG. 3 is a cross sectional schematic of the reactor tube's inlet and outlet elements in expanded detail.

A more detailed depiction of a reactor tube's injector and collector regions are shown in cross section in FIG. 3. In the injector region 10, the gas inlet nozzle 1 is separated from the bottom end plate 3 and reactor tube wall 4 by a small gap 9 which admits a predetermined amount of liquid, from the supply reservoir 2, into the tube near the wall. This gap may be contiguous around the diameter of the reactor tube or one separated by spacers for mechanical stability, or may simply be holes in the gas injector. The liquid is kept on the walls of the reactor tube by the action of surface tension and the pressure of the gas stream. At the collector end 13 the liquid film 2a is stripped off by a collector and directed into a collection reservoir 8. Again the presence of a gap 12 between the top end plate 6 and collector 7 separates the gas flow and the liquid flow.

Figure 4:
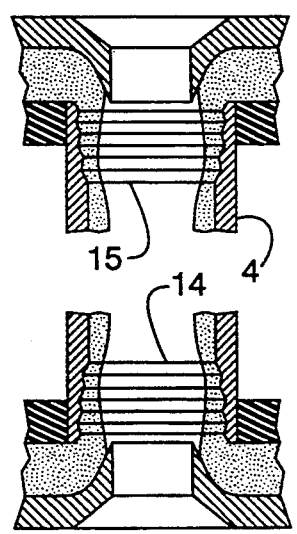
FIGS. 4 through 8 are cross sectional schematics showing variations in the design of the reactor tube's inlet and outlet elements in expanded detail.

FIG. 4 shows an alternative design for the injector and collector regions in cross section. In this embodiment, a series of threads or grooves 14 and 15 are ground into (or otherwise attached to) the reactor tube wall 4. This has a rifling effect of imparting a rotational motion or swirling action to the liquid film which assists in forcing the liquid film to the reactor tube's wall and into the collection reservoir. Alternatively, a simple countersink may also accomplish the same effect. FIG. 4 shows a threaded countersunk entrance and exit.

Figure 5:
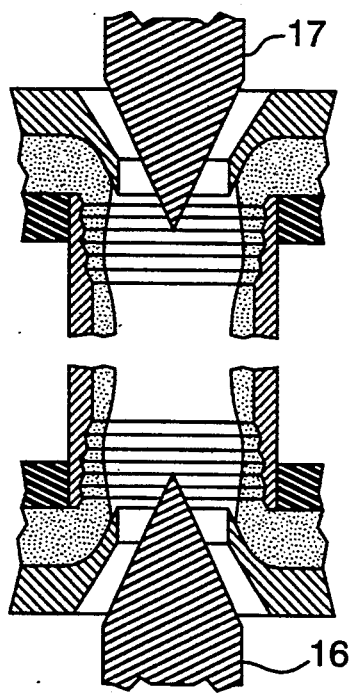

FIG. 5 shows an alternative design which uses a conical deflector, 16 and 17, to assist the process of gas injection and collection.

Figure 6:
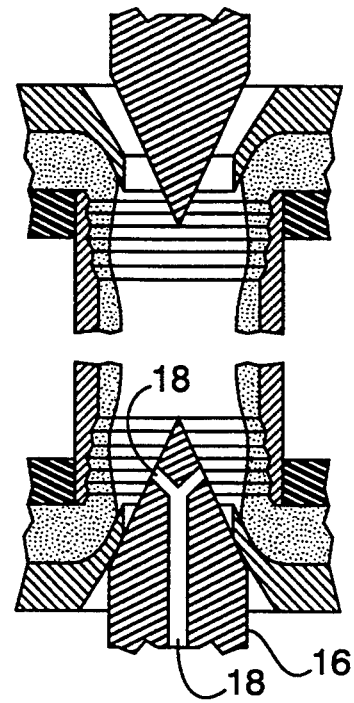

In another design option, shown in FIG. 6, gas inlets 18 are incorporated into a conical deflector 16 to induce a gas swirl. The inlets are directed tangent to the surface of the conical deflector to produce the swirling motion which helps force the liquid to the wall.

Figure 7:
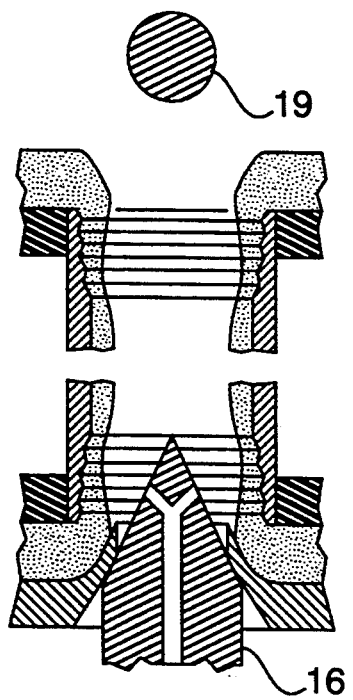

In another alternative design shown in FIG. 7, the reactor tube's collector region's separator plate is removed and the gas and liquid are separated by an impact separator 19 and the force of gravity. In this embodiment, the gravity vector could be aligned anywhere from directly opposing the gas velocity to almost perpendicular to the gas velocity or any angle in between. In this embodiment, the conical inlet 16 is at the injector end of the reactor tube.

Figure 8:
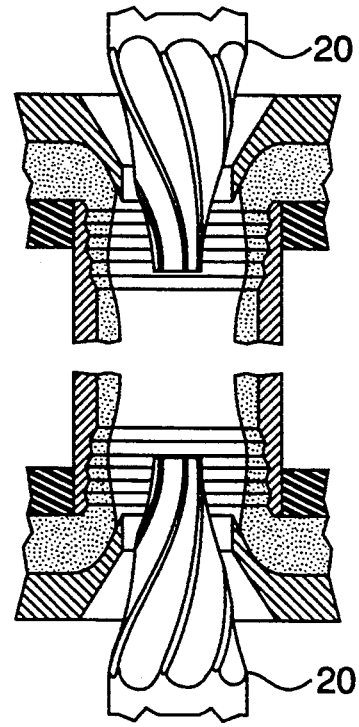

FIG. 8 shows an alternative design which uses a helical or screw type deflector 20 to assist the process of gas injection and collection.

Figure 9:
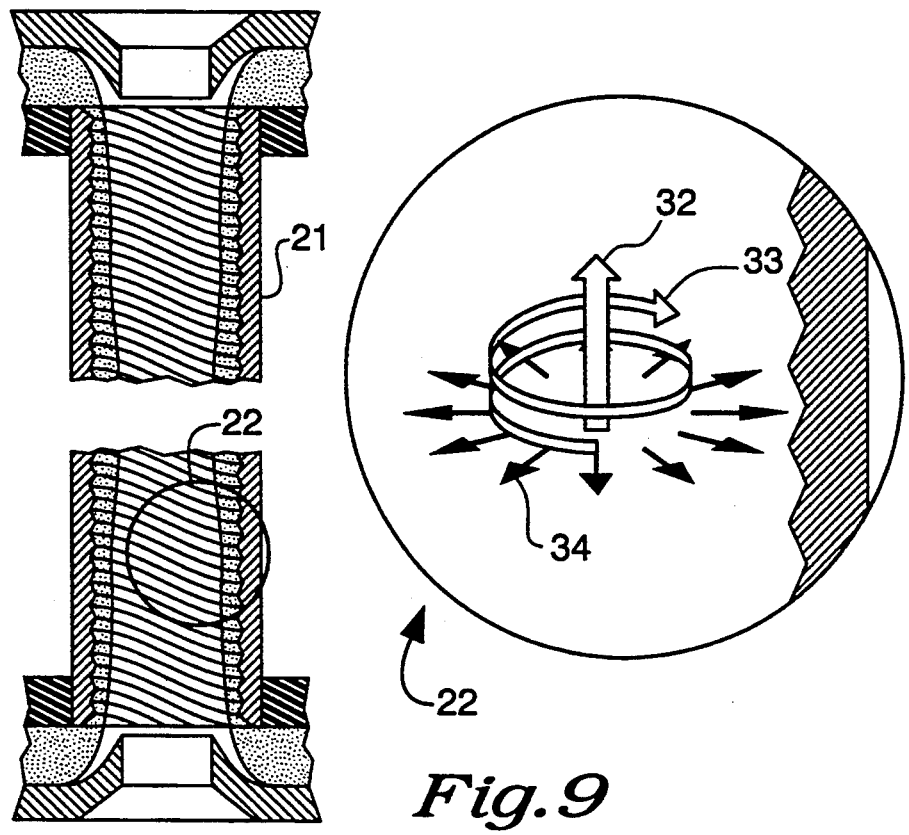
FIG. 9 is a cross sectional schematic showing a design variation of a reactor tube's internal configuration which provides a higher degree of gravity independence.

In FIG. 9, the straight-walled reactor tube 5 of earlier figures is replaced by a grooved, threaded, or corrugated tube 21. In this embodiment, as the axial pressure gradient 32 attempts to drive the liquid along the wall, the threads or corrugations force the liquid to travel in a helical path 33 along the tube. This introduces an angular motion and a resulting centrifugal force 34 which will further force the liquid stream against the wall as illustrated in detail 22. Depending on the tube diameter and liquid and gas flow rates, such centripetal forces could exceed the acceleration due to gravity at sea level (nominally 980 cm/sec$^2$). Such a device would be completely independent of gravity. In a weightless environment such as space, even a modest acceleration would ensure that the liquid would stay on the reactor tube's wall. In this embodiment, as in the others, the liquid inlets may be so arranged as to induce a rotational motion into the flow at the entrance to the tube to ensure that injection of the liquid is tangent to the wall.

Figure 10:
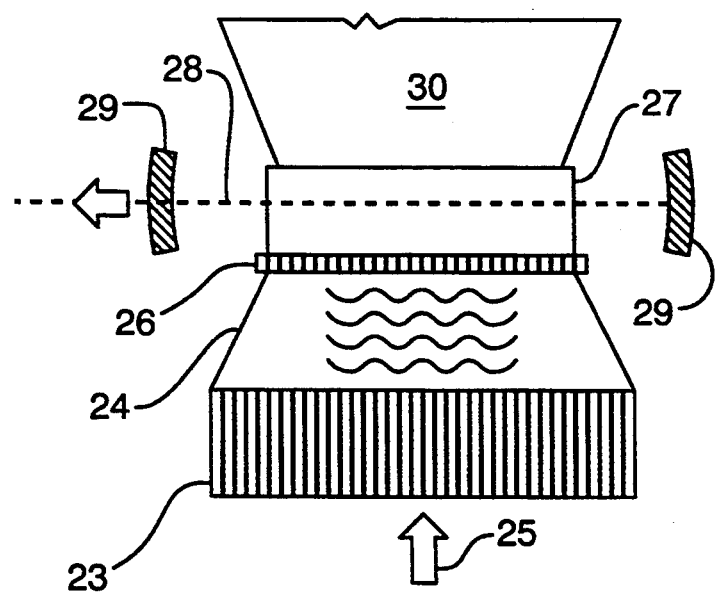
FIG. 10 is a schematic showing how the electronically excited oxygen reactors illustrated in FIGS. 1 through 9 may be used by a conventional, chemically pumped atomic iodine laser.

FIG. 10 illustrates how the invention may be used to power a high energy chemical laser. A reactor 23 (such as illustrated in FIG. 2) may be attached to a cold trap 24 if desired to perform further purification of the gas stream. In this example, gas flow is in the direction of arrow 25. Upon leaving the cold trap 24, the gas enters a nozzle 26 in which molecular iodine is injected, in a conventional manner, and expands (either with subsonic or supersonic velocity) into the laser cavity 27. Lasing occurs along axis 28 and is produced by the interaction of mirrors 29 which represent a conventional unstable (or stable) optical resonator. The exhaust then flows into the pressure recovery region 30 where flow is maintained by a conventional vacuum pump or ejector system.

In a typical application of the invention, gas pressures within the reactor are in the range of tens to hundreds of Torr. The reactor's tube diameter's is relatively small, on the order of fractions of an inch. The reactor length is in the range of tens to a hundred centimeters long.

ILLUSTRATIVE DESIGN EXAMPLE

The dependence of key parameters on the selected configuration can be explained by a simple analysis. The utilization (fraction of chlorine) converted into oxygen is given by the formula $$Utilization = 1 - e^{-t/\tau},$$

where t is the time spent by the chlorine gas inside the reactor tube (residence time) and $\tau$ is a parameter characteristic of the specific configuration. The parameter $\tau$ is given by the formula $$\tau = 1 \div (K_c \times 'a'),$$

where $K_c$ is the overall mass transfer coefficient and 'a' is the [specific] surface area per unit length of the tube. From experiments we have found that $K_c$ is $\sim 50$ cm/s and a=4/d, where 'd' is the internal gas diameter of the tube. That is, 'd' is equal to the physical diameter of a reactor tube minus twice the film thickness.

In one illustrative embodiment, using 500 1.59 mm (1/16th inch) diameter reactor tubes (each 30 cm long) and a chlorine gas flow rate of 0.15 moles $Cl_2$/s diluted with 0.45 moles/s Helium, a utilization of 93.27% was found. In this illustrative system, hydrogen peroxide liquid is driven along the length of the reactor tube (induced by the pressure drop along the length of the tube) at a velocity of approximately 5 cm/s. The yield (Y) of the excited oxygen (ratio of excited oxygen to total oxygen) from the illustrative apparatus is found from the relation established in our laboratory:

$$1/Y = 1.16 + 2P_{O_2}t,$$

where $P_{O_2}$ is the generator's oxygen pressure in Torr and 't' is the chlorine gas residence time. For the example introduced above, operating at 150 Torr total pressure, the yield was found to be 77%.

The centripetal force generated by swirl is found from the mean liquid velocity, tube diameter and angle of the swirl. In the case discussed, the centripetal force is about 0.1 times the acceleration of gravity for a 45 degree swirl.

It will be appreciated by those of ordinary skill having the benefit of this disclosure that numerous variations from the foregoing illustrations will be possible without departing from the inventive concept described herein. Accordingly, it is the claims set forth below, and not merely the foregoing illustrations, which are intended to define the exclusive rights claimed in this application.

I claim:

1. Apparatus for generating molecular oxygen gas in the electronically excited singlet delta state comprising:
    (a) a hydrogen peroxide supply reservoir, having a supply-reservoir floor;
    (b) a hydrogen peroxide collection reservoir, having a collection-reservoir wall;
    (c) a hollow reaction tube, having a substantially unobstructed central region, extending between said supply reservoir and said collection reservoir, said reaction tube having a supply end and a collection end and a substantially straight-walled inner surface;
    (d) an injector extending from said supply-reservoir floor into the supply end of said reaction tube and creating a gap between said injector and an interior surface of said supply end;
    (e) a collector extending from said collection-reservoir wall into the collection end of said reaction tube and creating a gap between said injector and an interior surface of said collection end.

2. The apparatus of claim 1, wherein said hydrogen peroxide supply reservoir contains a fluid that comprises a compound selected from the group consisting of potassium hydroxide, sodium hydroxide, or lithium hydroxide.

3. The apparatus of claim 1, wherein one or more of said hollow reaction tubes are positioned within a housing and are actively cooled.

4. The apparatus of claim 1, wherein one or more threads or grooves are affixed to an interior wall of said hollow reaction tube.

5. The apparatus of claim 1, wherein said injector comprises an injector conical deflector.

6. The apparatus of claim 5, wherein a gas inlet is internal to said injector conical deflector.

7. The apparatus of claim 1, wherein said collector comprises a collector conical deflector.

8. The apparatus of claim 1, wherein said collector comprises an impact separator.

9. The apparatus of claim 1, wherein said injector comprises a helical or screw deflector.

10. The apparatus of claim 1, wherein said collector comprises a helical or screw deflector.

11. The apparatus of claim 1, wherein said injector introduces liquid in a direction substantially tangent to the hollow reaction tube's interior wall.

12. The apparatus of claim 1, wherein said hollow reaction tube has an essentially circular interior cross section.

13. The apparatus of claim 1, wherein said hollow reaction tube has a corrugated interior surface.

14. Apparatus for generating molecular oxygen gas in the electronically excited singlet delta state comprising:
(a) a hydrogen peroxide supply reservoir, having a supply-reservoir floor;
(b) a hydrogen peroxide collection reservoir, having a collection-reservoir wall;
(c) a hollow reaction robe, having a substantially unobstructed central region, extending between said supply reservoir and said collection reservoir, said reaction tube having a supply end and a collection end and a continuously corrugated inner surface;
(d) an injector extending from said supply-reservoir floor into the supply end of said reaction tube and creating a gap between said injector and an interior surface of said supply end;
(e) a collector extending from said collection-reservoir wall into the collection end of said reaction tube and creating a gap between said injector and an interior surface of said collection end.

15. Apparatus for generating molecular oxygen gas in the electronically excited singlet delta state comprising:
(a) a hydrogen peroxide supply reservoir;
(b) a hydrogen peroxide collection reservoir;
(c) a hollow reaction tube having a substantially unobstructed central region extending between said supply reservoir and said collection reservoir, said reaction tube having a supply end operatively coupled to said supply reservoir and a collection end operatively coupled to said collection reservoir and a substantially straight-walled inner surface;
(d) means for admitting a liquid into said reaction tube from said supply reservoir;
(e) means for injecting chlorine gas into said reaction tube at the reaction tube's supply end at a flow rate sufficient to force said fluid to flow substantially along said reaction tube's inner surface; and
(f) means for separating said chlorine gas, said fluid and the resulting molecular oxygen gas at said reaction tube's collection end.

16. The apparatus of claim 15, wherein said hydrogen peroxide supply reservoir contains a fluid that comprises a compound selected from the group consisting of potassium hydroxide, sodium hydroxide, or lithium hydroxide.

17. The apparatus of claim 15, wherein one or more of said hollow reaction tubes are positioned within a housing and are actively cooled.

18. The apparatus of claim 15, wherein said means for admitting a liquid introduces said liquid in a direction substantially tangent to the hollow reaction tube's interior wall.

19. The apparatus of claim 15, wherein said hollow reaction tube has an essentially circular interior cross section.

20. The apparatus of claim 15, wherein said hollow reaction tube has a continuously corrugated inner surface.

* * * * *

UNITED STATES PATENT AND TRADEMARK OFFICE
CERTIFICATE OF CORRECTION

PATENT NO. : 5,417,928
DATED : May 23, 1995
INVENTOR(S) : William E. McDermott

It is certified that error appears in the above-identified patent and that said Letters Patent is hereby corrected as shown below:

Column 7, line 42 (Claim 14(c)): Delete "robe" and insert "tube".

Signed and Sealed this

Twenty-fifth Day of July, 1995

Attest:

BRUCE LEHMAN

Attesting Officer

Commissioner of Patents and Trademarks